United States Patent [19]

Love

[11] 3,757,146

[45] Sept. 4, 1973

[54] THERMOELECTRIC GENERATOR

[76] Inventor: Wesley Love, 2472 Observatory Rd., Cincinnati, Ohio 45208

[22] Filed: May 12, 1971

[21] Appl. No.: 142,667

[52] U.S. Cl. .................. 310/4, 136/205, 310/113

[51] Int. Cl. .................. H01v 1/30

[58] Field of Search .............. 136/205, 208; 310/4; 322/2 R; 321/1.5

*Primary Examiner*—Lewis H. Myers

*Assistant Examiner*—H. Huberfeld

*Attorney*—Melville, Strasser, Foster & Hoffman

[57] ABSTRACT

A thermoelectric generator having a housing which is provided with opposed heat and cold source means positioned so as to define a centrally elongated space therebetween. A rotor shaft is centrally disposed in the housing in the space between the heat and cold source means, and at least one group of substantially coplanar metal blades is radially disposed about the shaft and extend into the heat and cold source means. Each of the metal blades is provided with brush means at the end thereof adjacent the shaft, and opposed pick up bar means are positioned in the space so as to be contiguous with the brush means on adjacent blades. Terminal means are associated with each pick up bar means and means are provided to rotate the shaft.

13 Claims, 4 Drawing Figures

INVENTOR/S

WESLEY LOVE

BY *Melville, Strasser, Foster and Hoffman*
ATTORNEYS

INVENTOR/S

WESLEY LOVE

BY Melville, Strasser, Foster and Hoffman
ATTORNEYS

THERMOELECTRIC GENERATOR

BACKGROUND OF THE INVENTION

1. Field of the Invention

This invention relates generally to thermoelectric generators and, more particularly, to generators in which heat is directly converted to electricity by thermoelectric means.

2. Description of the Prior Art

While the thermoelectric phenomenon was discovered more than one hundred years ago, the thermoelectric generation of electrical power has been fraught with problems and the art has been unable to develop a thermoelectric generator which is practical and efficient as a source of electrical energy.

SUMMARY OF THE INVENTION

The present invention provides an improved thermoelectric generator which is practical and efficient as a source of electrical energy. In its broadest application, the generator comprises a housing having therein opposed heat and cold source means which are disposed so as to define a centrally elongated space therebetween. A rotor shaft is centrally disposed in the housing in the space between the heat and cold source means, and at least one group of substantially coplanar metal blades are provided about the shaft extending into the heat and cold source means. Each of the blades is operatively connected to the shaft and is provided with brush means at the end thereof adjacent the shaft.

Opposed pick up bar means are located in the housing in the space between the heat and cold source means and are contiguous with the brush means on adjacent blades.

Terminal means are associated with each of the pick up bar means and means are provided to rotate the shaft.

In operation, as the shaft rotates each of the blades continuously passes through the hot and cold source means and the space therebetween, and the brush means traverse the pick up bar means. When two opposed blades pass from the heat and cold source means, respectively, and are momentarily positioned in the space therebetween, the brush means associated therewith are contiguous with the opposed pick up bar means. A flow of charge carriers is induced from the blade which immediately passed from the hot source means to the blade which immediately passed from the cold source means because of the temperature gradient therebetween. Accordingly, an electro motive force is created across the opposed pick up bars and thus across the terminal means.

DESCRIPTION OF THE PREFERRED EMBODIMENTS

Figures 1, 2:
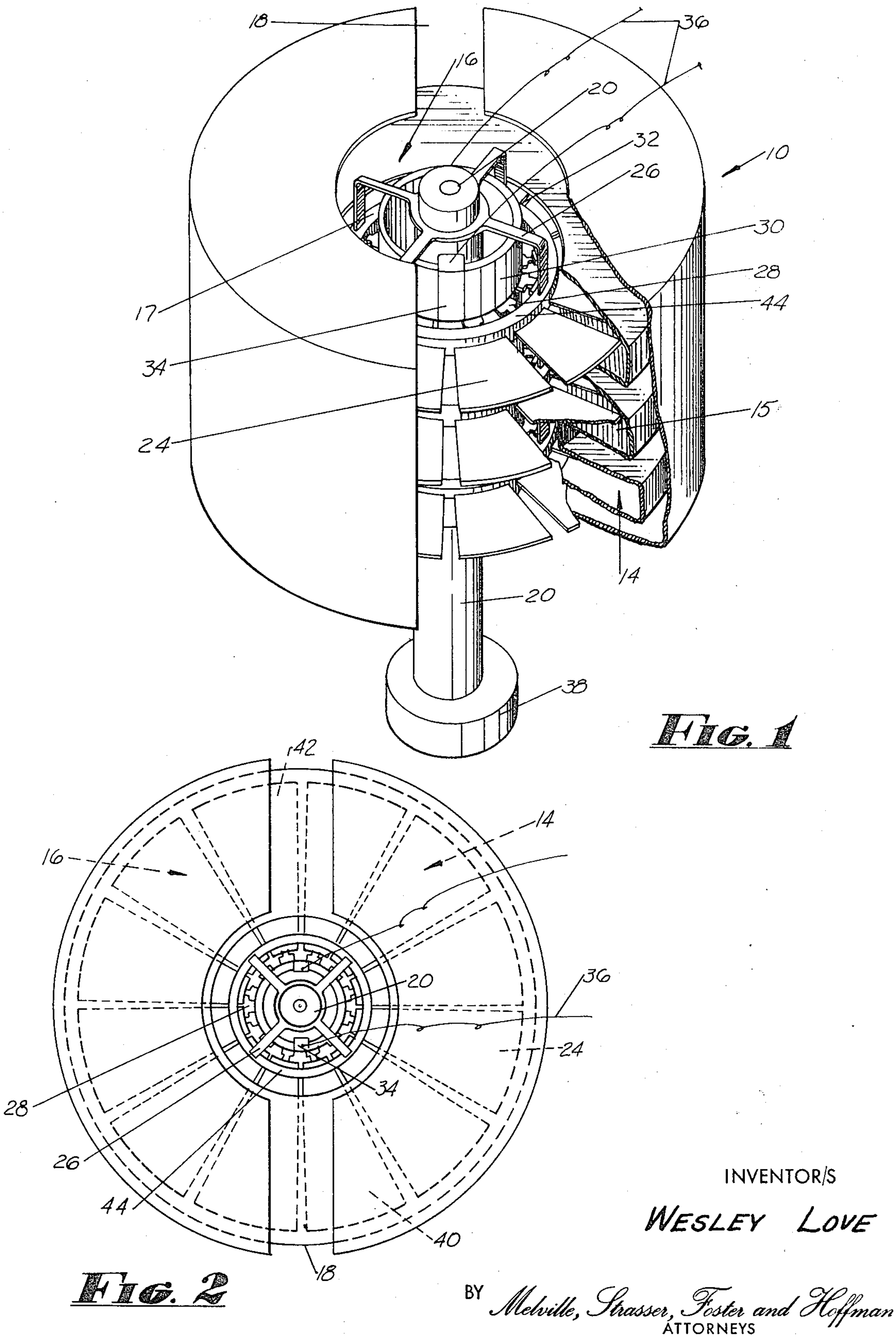
FIG. 1 is a partially cut-away perspective view of one embodiment of the thermoelectric generator according to the present invention.
FIG. 2 is an enlarged plan view of the thermoelectric generator of FIG. 1.

Referring now to the drawings, and in particular to FIGS. 1 and 2, there is shown a thermoelectric generator 10 comprising an outer container or housing 12 having therein opposed heat and cold source means 14 and 16, respectively. The heat and cold source means 14 and 16 are disposed within the housing 12 so as to define a centrally elongated space 18 therebetween.

The heat and cold source means 14 and 16 may be any suitable hot or cold sources, with the only limitation being, as will be more fully explained hereinafter, that such sources must provide a temperature gradient between the blades 40 (FIGS. 1 and 2) or 48 (FIGS. 2 and 3), which have immediately passed from the chamber 15 in the heat source means 14, and the blades 42 (FIGS. 1 and 2) or 50 (FIGS. 2 and 3), which have immediately passed from the chamber 17 in the cold source means 16. For example, the heat and cold sources 14 and 16 may comprise an airplane engine and the air surrounding the airplane, respectively, or, if the thermoelectric generator 10 is used in outer space, the sun and outer space, respectively. If the thermoelectric generator 10 is used at an Antarctic station, the heat source 14 may comprise an atomic pile and the cold source 16 may comprise ice and snow.

A rotor shaft 20 is positioned centrally within the housing 12 in the elongated space 18 between the heat and cold source means. At least a first group of substantially coplanar blades 24 are radially disposed about the shaft 20 and extend into the chambers 15 and 17 in the heat and cold source means 14 and 16, respectively. Each of the blades 24 is operatively connected to the shaft 20, such as through the supporting means or bracket 26. Additionally, each blade 24 is provided with brush means, such as the carbon brushes 28, at the end thereof adjacent the shaft 20.

At this point it should be understood that the number of groups of coplanar metal blades 24 which will be positioned or stacked along the axis of the shaft 20 will, of course, depend upon the electro motive force which it is desired to furnish to an external circuit load. Additionally, it should also be noted that the blades 24 may be made of any material with low resistivity and a high electron specific heat, such as, for example, copper, silver or gold. However, it will, of course, also be understood that any suitable alloy may be utilized.

The surfaces of the blades 24 may also be treated in any desired manner such that they will absorb and radiate heat. For example, the surface of the blades may be black and rough, possibly even serrated or perforated. If the blades 24 rotate in a fluid, such as air, they may also be constructed so as to stir or agitate the fluid to promote heat transfer. Likewise, if the thermoelectric generator is used in a vacuum, such as interplanetary space, the blades may be perfectly flat.

A non-conducting stationary spool 30 is held in position by the ribs 32 around the rotor shaft 20. As can be seen, the outside surface of the stationary spool 30 is contiguous with the carbon brushes 28 on the ends of the blades 24 adjacent the shaft 20.

Opposed pick up bar means 34 are mounted on the stationary spool 30 so as to straddle the rotor shaft 20 and lie in the centrally elongated space 18 coplanar with the shaft 20 and contiguous with the carbon brushes 28 of adjacent blades 24. Terminal means 36 are associated with each of the pick up bar means 34. In operation, lead wires connect the terminal means 36 with an external circuit load, such as any desired machine.

Means, such as a small motor 38, may be used to rotate the rotor shaft 20. As the shaft rotates, each of the blades 24 continuously passes through the chambers 15 and 17 in the heat and cold source means 14 and 16, respectively, and the space 18 therebetween, and the carbon brushes 28 on the blades 24 traverse the pick up bar means 34. When two opposed blades on each group of coplanar blades, such as the blades 40 and 42, pass from the chambers 15 and 17 of the heat and cold source means 14 and 16, respectively, they are momentarily positioned in the centrally elongated space 18 therebetween and the carbon brushes 28 associated therewith are contiguous with the opposed pick up bar means 34. Accordingly, a flow of charge carriers is induced from the blade 40, which immediately passed from the chamber 15 in the heat source means 14, to the blade 42, which immediately passed from the chamber 17 in the cold source means 16, because of the temperature gradient therebetween. This creates an electro motive force across the pick up bar means 34 and thus across the terminal means 36.

At this point it should be noted that the electro motive force so produced comprises pulsations of direct current. While the pulsations of direct current are associated with an emf measured in micro volts per degree Centigrade of temperature difference between the hot and cold blades, a step up transformer may, of course, be utilized to step the pulsations up to a useful level.

It should, perhaps, be noted that it is extremely important that insulation be provided between the supporting means or member 26 and the individual blades 24. This may be accomplished by an insulating ring 44 which is disposed between the member 26 and which encircles the blades 24 in a collar-like manner.

Figures 3, 4:
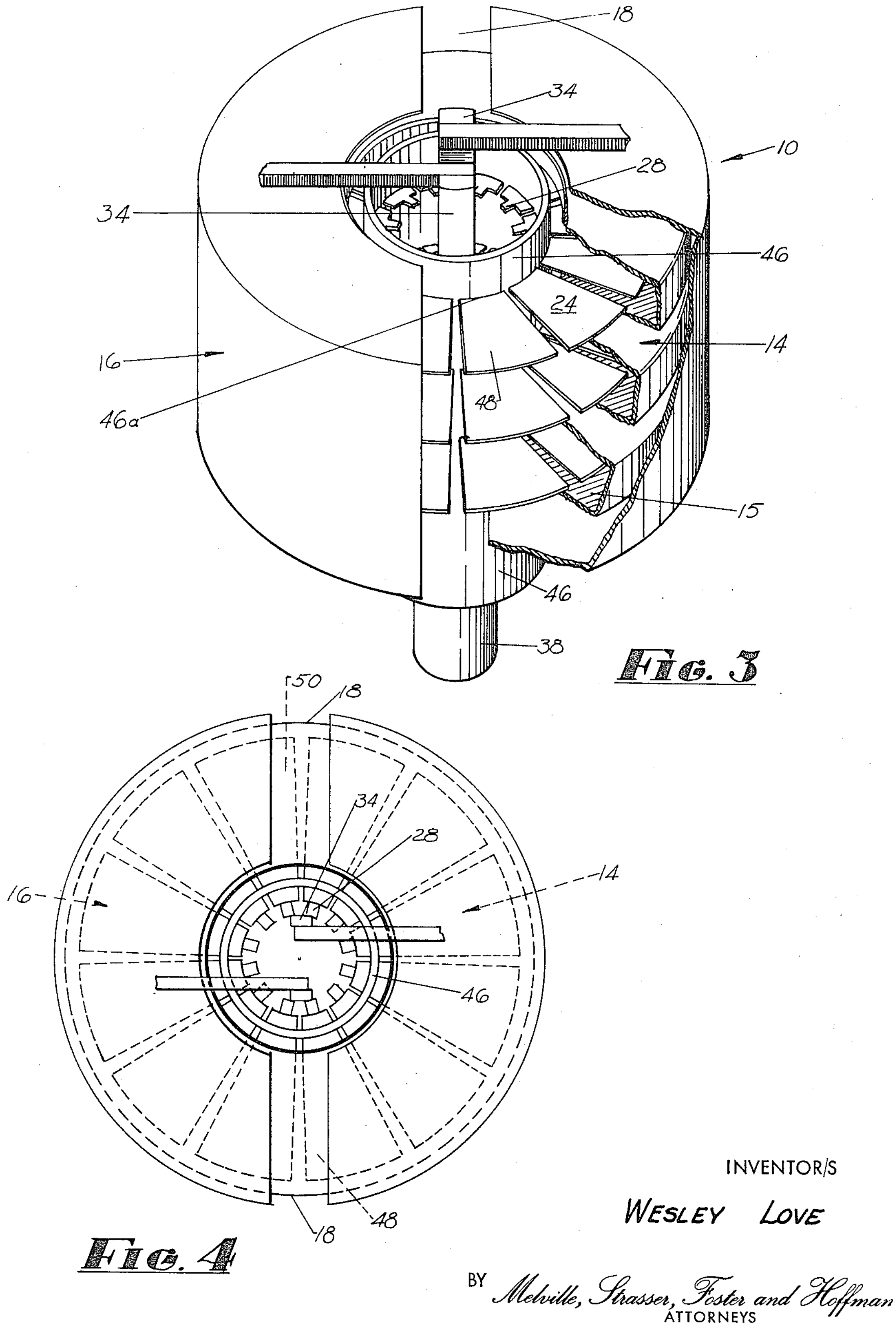
FIG. 3 is a partially cut-away perspective view of a second embodiment of the thermoelectric generator according to the present invention.
FIG. 4 is an enlarged plan view of the thermoelectric generator of FIG. 3.

Referring now to FIGS. 3 and 4, a second embodiment of the thermoelectric generator of the present invention will be explained. At this time it should be emphasized that the operation of the thermoelectric generator shown in FIGS. 3 and 4 is identical with its operation as disclosed in FIGS. 1 and 2, and that corresponding reference numerals have been utilized.

The major modifications disclosed in FIGS. 3 and 4 include the fact that the rotor shaft 46 is hollow and substantially larger in diameter than the rotor shaft 20 disclosed in FIGS. 1 and 2. Slots **46*a* are located in the shaft 46 and receive the substantially coplanar metal blades 24, which are radially disposed about the shaft 46 and extend into the chambers 15 and 17 in the heat and cold source means 14 and 16, respectively. The end of each of the blades 24 which is provided with the brush means, such as the carbon brushes 28, extend into the interior of the hollow rotor shaft 46. Each blade 24** is held securely in position by means of welding or other suitable fastening means.

The opposed pick up bar means 34 are positioned in a stationary manner within the hollow rotor shaft 46 and lie in the plane of the centrally elongated space 18 and contiguous with the carbon brushes 28 of adjacent blades 24.

In operation, as means, such as the small motor 38, rotate the shaft 46, each of the blades 24 continuously passes through the chambers 15 and 17 in the heat and cold source means 14 and 16, respectively, and the space 18 therebetween, and the carbon brushes 28 on the blades 24 traverse the opposed pick up bar means 34. When two opposed blades on each group of coplanar blades, such as the blades 48 and 50, pass from the chambers 15 and 17 of the heat and cold source means 14 and 16, respectively, they are momentarily positioned in the centrally elongated space 18 therebetween and the carbon brushes 28 associated therewith are contiguous with the stationary opposed pick up bar means 34 within the rotor shaft 46. Accordingly, a flow of charge carriers is induced from the blade 48, which immediately passed from the chamber 15 in the heat source means 14, to the blade 42, which immediately passed from the chamber 17 in the cold source means 16, because of the temperature gradient therebetween. This creates an electro motive force across the pick up bar means 34 and thus across the terminal means 36.

While the chambers 15 and 17 in the heat and cold source means 14 and 16, respectively, need not be sealed from the elongated space 18 therebetween, suitable prior art seal means may be utilized so long as the rotation of the blades 24 (FIGS. 1 and 2) and 48 (FIGS. 3 and 4) is in no way impeded, for if this occurs, the efficiency of the thermoelectric generator 10 is reduced.

As will be evident from the foregoing description, certain aspects of this invention are not limited to the particular details of construction of the examples illustrated, and it is contemplated that various other modifications or applications will occur to those skilled in the art. It is, therefore, intended that the appended claims shall cover such modifications and applications as do not depart from the true spirit in scope of the invention.

What I claim is:

1. A thermoelectric generator, which comprises:

a. a housing having therein opposed heat and cold source means, said heat and cold source means being disposed within said housing so as to define a centrally elongated space therebetween;

b. a rotor shaft centrally disposed in said housing and the space between said heat and cold source means;

c. at least one group of substantially coplanar blades radially disposed about said shaft and extending into said heat and cold source means, each said blade being operatively connected to said shaft and being provided with brush means at the end thereof adjacent said shaft;

d. opposed pick up bar means positioned in said housing within said elongated space contiguous with said brush means of said blades;

e. terminal means associated with each said pick up bar means; and f. means to rotate said shaft, whereby as said shaft rotates, each said blade continuously passes through said heat and cold source means and said elongated space therebetween and said brush means traverse said pick up bar means, and whereby when two opposed blades pass from said heat and cold source means, respectively, they are momentarily positioned in said elongated space therebetween, and said brush means associated therewith are contiguous with said opposed pick up bar means, thereby inducing the flow of charge carriers from said blade which immediately passed from said heat source means to said blade which immediately passed from said cold source means, because of the temperature gradient therebetween, so as to create an electromotive force across said opposed pick up bar means and thus across said terminal means.

2. The thermoelectric generator according to claim 1, including a plurality of groups of substantially identical coplanar blades along the axis of said shaft, and wherein said opposed pick up bar means extend the axial length of said groups of blades.

3. The thermoelectric generator according to claim 2, wherein each said blade is mounted from supporting means attached to said shaft and wherein said opposed pick up bar means straddle said shaft and are coplanar therewith.

4. The thermoelectric generator according to claim 3, wherein a non-conducting stationary spool is disposed in said housing around said shaft, the outside surface thereof being contiguous with said brush means, and wherein said opposed pick up bar means are mounted on said spool.

5. The thermoelectric generator according to claim 3, wherein an insulating ring is positioned between said support means and said blades.

6. The thermoelectric generator according to claim 5, wherein said brush means comprise carbon brushes.

7. The thermoelectric generator according to claim 6, wherein said blades are made of a material with low resistivity and a high election specific heat.

8. The thermoelectric generator according to claim 7, wherein said means to rotate said shaft comprises a motor.

9. The thermoelectric generator according to claim 2, wherein said shaft is hollow and provided with slots therein through which the ends of said blades provided with said brush means extend, and wherein said pick up bar means are positioned within said shaft.

10. The thermoelectric generator according to claim 9, wherein said shaft comprises insulating material.

11. The thermoelectric generator according to claim 10, wherein said brush means comprise carbon brushes.

12. The thermoelectric generator according to claim 11, wherein said blades are made of a material with low resistivity and a high election specific heat.

13. The thermoelectric generator according to claim 12, wherein said means to rotate said shaft comprises a motor.

* * * * *